United States Patent
Gaydek et al.

[11] Patent Number: 6,131,477
[45] Date of Patent: Oct. 17, 2000

[54] DRIVE GEAR HAVING AN INTERNAL FLEXIBLE COUPLING

[75] Inventors: Gerald Joseph Gaydek, Plymouth; Henry Stefan Krautner, Clawson, both of Mich.

[73] Assignee: Detroit Diesel Corporation, Detroit, Mich.

[21] Appl. No.: 08/935,748

[22] Filed: Sep. 23, 1997

[51] Int. Cl.⁷ .................. F16H 57/00; F16D 3/64
[52] U.S. Cl. .................. 74/411; 464/74; 464/76
[58] Field of Search .................. 74/411; 464/34, 464/87, 89, 73, 74, 76, 81–84

[56] References Cited

U.S. PATENT DOCUMENTS

| | | | |
|---|---|---|---|
| 2,961,856 | 11/1960 | Selzer | 464/74 |
| 3,517,754 | 6/1970 | Hughes | 464/74 X |
| 3,620,044 | 11/1971 | Latour | 464/74 |
| 3,830,081 | 8/1974 | Weber et al. | 464/76 X |
| 4,032,267 | 6/1977 | Miller | 464/74 X |
| 4,307,584 | 12/1981 | Sandiumenge | 464/74 |
| 4,328,879 | 5/1982 | Tone | 464/74 X |
| 4,503,719 | 3/1985 | Hamano | 74/411 X |

*Primary Examiner*—David A. Bucci
*Assistant Examiner*—Marcus Charles
*Attorney, Agent, or Firm*—Bill C Panagos

[57] ABSTRACT

A drive gear train including a flexible coupling built into one of the gears to absorb shock load forces generated during gear train operation. The flexible coupling can include an inner annular member having a series of circumferentially spaced vanes projecting away from the gear rotational axis, and an outer annular member having a series of circumferentially spaced vanes projecting toward the gear rotational axis in the spaces formed between the firstmentioned vanes. Resilient deformable plugs are disposed between the confronting vane surfaces to absorb peak load forces.

12 Claims, 1 Drawing Sheet

DRIVE GEAR HAVING AN INTERNAL FLEXIBLE COUPLING

BACKGROUND AND SUMMARY OF THE INVENTION

This invention relates to a gear system wherein the drive gear has an internal resilient compressible plug means adapted to resiliently absorb high load forces that can occur during operation of the gear system. The internal force absorbing action is useful in various different situations, e.g. to accommodate temporary overload conditions, or to absorb cyclic overloads of a recurring nature, or to smooth the velocity of the driven gear for timing purposes, or to absorb load forces during system start-up periods, or to promote a smooth gear mesh action when the driven gear may have to rapidly accelerate to the speed of the drive gear.

In many gear systems a flexible coupling is often used to resiliently absorb peak forces that can occur randomly or cyclically. Usually the flexible coupling is a separate hardware item located between two aligned shafts in the gear system. The flexible coupling takes extra space, beyond the space requirements of the gear system. The present invention is directed to a gear system wherein a flexible coupling is incorporated into one of the gears, usually the drive gear. The invention is intended to minimize overall space requirements, and to reduce the cost of the shock-absorbing function. The built-in shock absorber reduces torsional stress on the associated gear, and thus prolongs the service life of the gear system.

Specific features and advantages of the invention will be apparent from the attached drawings and description of an illustrative embodiment of the invention.

DESCRIPTION OF A PREFERRED FORM OF THE INVENTION

Figure 1:
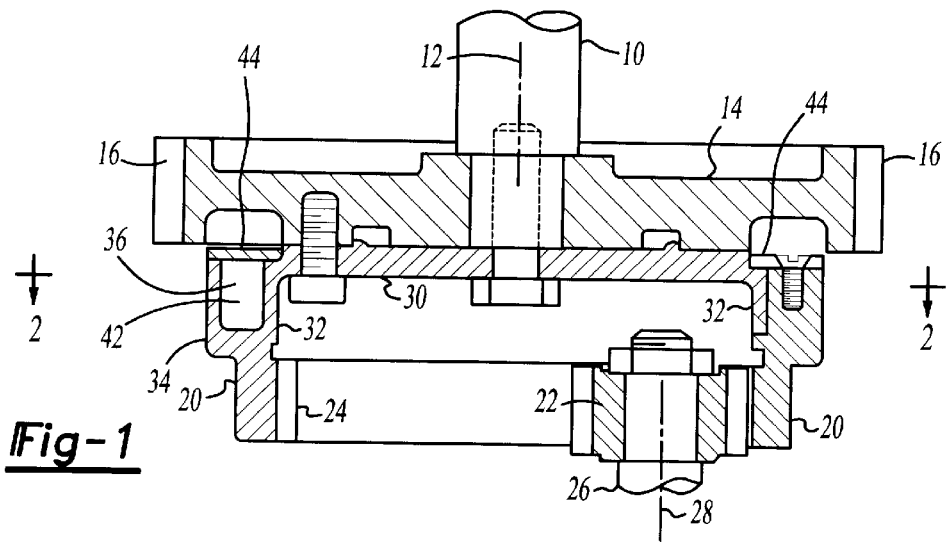
FIG. 1 is a cross sectional view taken through a gear system constructed according to the invention.
Figure 2:
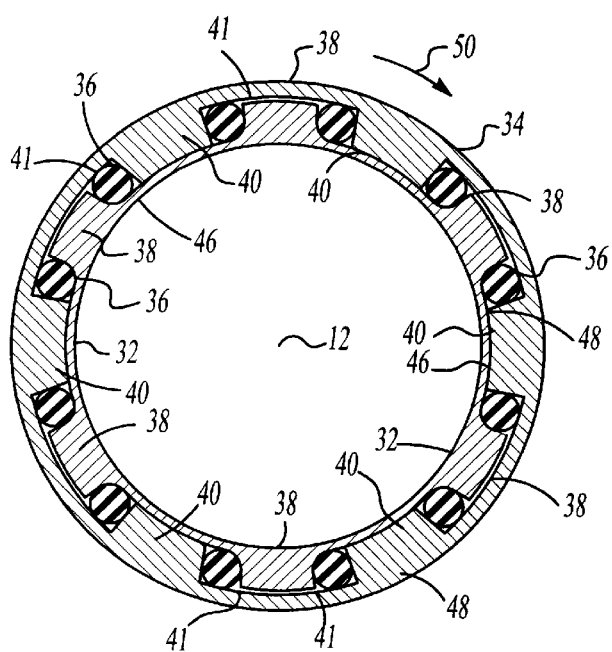
FIG. 2 is a transverse sectional view taken on line 2—2 in FIG. 1.

FIGS. 1 and 2 show a preferred form of the invention that includes a gear system comprising a drive shaft 10 mounted for rotation around the shaft axis 12. The shaft can be connected directly to a prime mover, not shown. Alternately, the shaft can be provided with an input gear 14 adapted to be driven from the prime mover by another gear, not shown, in mesh with gear teeth 16. Gear 14 represents merely one mechanism for applying a rotary drive force to shaft 10.

The invention is concerned with a gear system that includes a drive gear 20 connected to shaft 10, and a driven gear 22 in mesh with internal teeth 24 on gear 20. Gear 20 is a ring gear encircling the driven gear 22. The output shaft 26, attached to gear 22, may be connected to a power-using instrumentality, e.g. an alternator associated with an internal combustion engine. Shaft 26 is suitably mounted, or otherwise supported, for rotation around the shaft axis 28.

Drive gear 20 comprises a radial plate 30 suitably attached to shaft 10. An annular inner member 32, integral with plate 30, is axially telescoped into an annular outer member 34. Gear teeth 24 are formed on annular member 34.

It should be understood that the rotary drive force of shaft 10 is applied to inner annular member 32. The annular inner member transmits the drive force to outer member 34 through a series of resilient cylindrical plugs 36 spaced circumferentially around the annular members, as shown best in FIG. 2. The drawings show twelve cylindrical plugs 36 (in the FIG. 2 embodiment). However, the number of resilient plugs is not critical to practice of the invention.

Six of the cylindrical plugs are used to transfer a forward force from inner member 32 to outer member 34; the other six plugs absorb the rebound force generated by compression of the six forward-force transmitter plugs. In the illustrated gear systems the resilient compressible plugs are all cylindrical. However, other plug shapes can be used. For example, each resilient plug could be spherical. The cylindrical, or spherical, shape is advantageous in that each plug can be installed into the drive gear without having to orient the plug in a specific relation to the plug-receiving compartment.

As shown in FIG. 2, inner annular member 32 has six outwardly extending vanes (or walls) 38 radiating away from the gear rotational axis 12. The outer annular member 34 has six inwardly extending vanes (or walls) 40 interspersed between vanes 38. Each vane 40 subdivides the space between adjacent vanes 38 into two separate compartments 41; a single resilient cylindrical plug 36 is located in each compartment formed by the interspersed vanes 38 and 40. The vanes are dimensioned so that each resilient plug 36 has a snug fit in the associated compartment, such that there is no circumferential play of the inner and outer annular members 32 and 34 in the at-rest condition.

To insure a snug fit between each resilient plug 36 and the confronting surfaces of vanes 38 and 40, the plugs can be inserted into the associated compartments 41 in a cold (or frozen) condition. After the plugs have been installed they will thermally expand to have snug fits in the associated compartments.

The flat side surfaces of each vane 38 or 40 are located in radial planes originating at the gear rotational axis 12. The circular cross-sectional resilient plugs 36 have clearance with respect to two diagonal corners of the associated segment-shaped compartments 41, whereby the plug materials can undergo distortional motions into the clearance spaces when the vanes move closer together.

Each compartment 41 has an end wall defined by an internal radial surface 42 on the outer annular member 34. The other end wall of each compartment 41 is defined by an annular cover 44 that is screwed onto member 34 after member 32 has been telescoped axially into member 34, and plugs 36 have been inserted into the compartments. Gear 14 is attached to radial plate 30 after installation of cover 44.

Each vane 40 has an inner arcuate edge 46 that has a slidable fit on a circular surface 48 of the inner member 32. The outer member 34 can rotate on member 32 without destroying the concentricity of members 32 and 34. This is advantageous in transmitting radial loads that could adversely affect the meshing action of the teeth on gears 20 and 22. The service life of the gear teeth surfaces is comparable to the service life of conventional gears, due to the slidable bearing support provided by sliding surfaces 46 and 48.

The drive gear 20 can rotate in either the clockwise direction. Assuming gear 20 rotates in the clockwise direction, as indicated by arrow 50, a load force on gear teeth 24 will cause vanes 40 to exert counter clockwise forces on the resilient plugs 36 in contact with the leading side faces of vanes 38; those plugs will be squeezed so as to distort into corner spaces of the associated compartments 41.

The compressive action on the distorted plugs generates a counteracting force that produces a rebound of the outer member 34 in the clockwise direction. The rebound motion is resiliently snubbed by the resilient plugs in contact with the trailing side faces of vanes 38.

It will be seen that there are two separate sets of resilient plugs 36, i.e. one set of plugs on the leading face of each vane 38, and a second set of plugs on the trailing face of each vane 38. The two sets of resilient plugs cooperatively absorb peak shock forces in each direction, similar to the action of a separate flexible coupling. An advantage of the illustrated shock absorber is that it consumes minimal space in the gear system.

Figure 3:
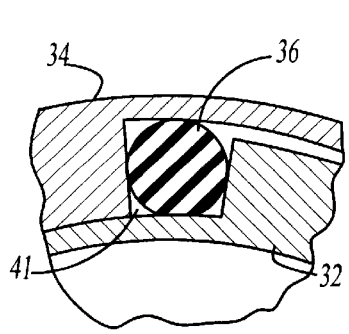
FIG. 3 is an enlarged fragmentary view taken through a variant of the structure shown in FIG. 2.

In the FIG. 2 arrangement two of the four corners of each compartment 41 are curved to conform approximately to the contour of cylindrical plugs 36. FIG. 3 shows an alternate arrangement wherein all four corners of each compartment 41 are spaced from the plug 36 surface. The invention can be practiced with either the FIG. 2 configuration or the FIG. 3 configuration. Plug expansion into the corners of compartments 41 is primarily radial in nature.

Figure 4:
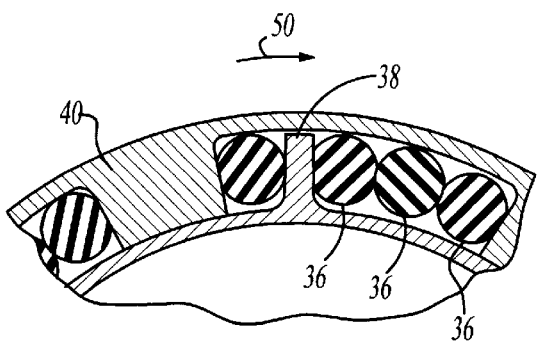
FIG. 4 is an enlarged fragmentary sectional view taken in the same direction as FIGS. 2 and 3, but showing a further form that the invention can take.

FIG. 4 shows a further form that the invention can take. In this case there are three resilient plugs 36 in each compartment formed by the leading face of each vane 38, and a single resilient plug 36 in each compartment formed by the trailing face of each vane 38. The use of multiple resilient plugs in a single compartment produces a relatively long cushion stroke in the primary shock absorber direction, and a relatively short snubbed stroke in the rebound direction.

The durometer of the plug material for the two sets of plugs can be varied, if so desired. Preferably the durometer of the elastomers is in the range of 75 to 85. Different durometers can be used in practice of the invention. The preferred plug shape is cylindrical or spherical. However a frusto-conical plug cross section mated to the vane side surfaces can also be used. The resilient plugs are preferably placed in compartments 41 without adhesive connections to the compartment surfaces; adhesive connections could interfere with flowability of the plug material.

What is claimed:

1. The gear system comprising a drive gear and a driven gear in mash with said drive gear; said drive gear comprising an inner annular member and an outer annular member; said inner annular member having plural outwardly extended walls, and said outer annular member having intervening inwardly extending walls forming plural circumferentially spaced compartments between said members; said inner and outer members are concentrically arranged around the rotational axis of said drive gear; said inner and outer members having mating circular bearing surfaces concentric around said drive gear rotational axis and compressible plug means in each said compartment for establishing resilient connections between the inner annular member and the outer annular member said inner and outer members being concentric around said drive gear axis irrespective of load forces exerted thereon by said compressible plug means and said driven gear; said outer annular member having an internal surface extending normal to said drive gear rotational axis to form one end wall of each said compartment; said inner annular member being axially telescoped within said outer member so as to abut said internal surface; and an annular cover spanning said inner and outer annular members in axial spaced rotation to said internal surface, whereby said cover forms an other end wall of each said compartment.

2. The gear system of claim 1, wherein each compressible plug means is circular.

3. The gear system of claim 1, wherein each compressible plug means is cylindrical.

4. The gear system of claim 1, wherein each compressible plug means has a circumferential dimension filling the circumferential dimension of an associated compartment; each compressible plug means having a radial dimension that does not fully occupy the radial dimension of the associated compartment, whereby each said plug means can expand radially in response to increased load forces applied to said plug means by the compartment walls.

5. The gear system of claim 1, wherein each plug means comprises a single circular plug substantially filling the associated compartment.

6. The gear system of claim 1, wherein said compressible plug means comprises a first set of plugs adapted to resiliently absorb load forces during forward motion of said drive gear, and a second set of plugs adapted to resiliently absorb rebound forces generated by compression of said first set of plugs.

7. The gear system of claim 6, wherein said first set of plugs comprises multiple plugs in each associated compartment; said second set of plugs comprising a single plug in each associated compartment.

8. The gear system of claim 6, wherein said first set of plugs comprises a single plug in each associated compartment; said second set of plugs comprising a single plug in each associated compartment.

9. The gear system of claim 6, wherein said first set of plugs comprises multiple circular plugs in each associated compartment; said second set of plugs comprising a single circular plug in each associated compartment.

10. The gear system of claim 6, wherein said first set of plugs comprises a single circular plug in each associated compartment; said second set of plugs comprising a single circular plug in each associated compartment.

11. The gear system of claim 1, wherein said compressible plug means compresses at least one cylindrical plug insertable into each compartment through an opening that is closed by said annular cover.

12. The gear system of claim 11, wherein each cylindrical plug has an axial length that substantially fills the axial dimension of each associated compartment.

\* \* \* \* \*